(12) United States Patent
Liu

(10) Patent No.: US 9,877,518 B2
(45) Date of Patent: Jan. 30, 2018

(54) BATTERY ROD, ELECTRONIC CIGARETTE, AND METHOD FOR ASSEMBLING A BATTERY ROD

(71) Applicant: HUIZHOU KIMREE TECHNOLOGY CO., LTD. SHENZHEN BRANCH, Shenzhen, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 0 days.

(21) Appl. No.: 15/113,047

(22) PCT Filed: Jan. 20, 2014

(86) PCT No.: PCT/CN2014/070921
§ 371 (c)(1),
(2) Date: Jul. 20, 2016

(87) PCT Pub. No.: WO2015/106457
PCT Pub. Date: Jul. 23, 2015

(65) Prior Publication Data
US 2017/0006919 A1    Jan. 12, 2017

(51) Int. Cl.
*A24F 47/00*    (2006.01)
*H01M 2/02*    (2006.01)
*H01M 2/08*    (2006.01)

(52) U.S. Cl.
CPC ............ *A24F 47/008* (2013.01); *H01M 2/026* (2013.01); *H01M 2/08* (2013.01); *H01M 2220/30* (2013.01)

(58) Field of Classification Search
CPC ..... A24F 47/008; A61M 11/042; A61M 15/06
See application file for complete search history.

(56) References Cited

U.S. PATENT DOCUMENTS

| | | | |
|---|---|---|---|
| 2011/0304282 A1* | 12/2011 | Li | A24F 47/008 315/362 |
| 2014/0182611 A1* | 7/2014 | Liu | A24F 47/008 131/329 |
| 2014/0196734 A1* | 7/2014 | Liu | A24F 47/008 131/329 |

(Continued)

*Primary Examiner* — Tulsidas C Patel
*Assistant Examiner* — Marcus Harcum

(57) ABSTRACT

A battery rod, an electronic cigarette, and a method for assembling the battery rod, the battery rod comprises a battery casing, a battery, a control module and an end cover; the control module comprises wires and an airflow sensor; the end cover comprises a cover body and a connecting sleeve which is embedded in an elastic installation base; the control module is embedded on the elastic installation base; an outer peripheral surface of the elastic installation base flexibly abuts an inner wall of the connecting sleeve, and an inner peripheral surface of the elastic installation base flexibly abuts an outer peripheral surface of the control module; the wires are flexibly pressed between the control module and the elastic installation base. The elastic installation base is used to ensure the battery rod is airtight and the air flow sensor has a high sensitivity, preventing the wires from damaging the control module.

19 Claims, 6 Drawing Sheets

(56) References Cited

U.S. PATENT DOCUMENTS

| | | | | |
|---|---|---|---|---|
| 2014/0290675 A1* | 10/2014 | Xiang | ................. | A24F 47/008 |
| | | | | 131/329 |
| 2014/0360516 A1* | 12/2014 | Liu | ................. | A24F 47/008 |
| | | | | 131/329 |
| 2015/0208724 A1* | 7/2015 | Wu | ................. | A24F 47/008 |
| | | | | 131/329 |
| 2015/0216236 A1* | 8/2015 | Bless | ................. | A24F 47/008 |
| | | | | 131/328 |
| 2016/0128387 A1* | 5/2016 | Chen | ................. | A24F 47/008 |
| | | | | 392/395 |
| 2016/0150820 A1* | 6/2016 | Liu | ................. | A24F 47/002 |
| | | | | 137/239 |

* cited by examiner

BATTERY ROD, ELECTRONIC CIGARETTE, AND METHOD FOR ASSEMBLING A BATTERY ROD

TECHNICAL FIELD

The present application relates to the technical field of an electronic cigarette, and more particularly, relates to an atomizing assembly, an electronic cigarette and a method for assembling electronic cigarette.

BACKGROUND

As shown in FIG. 1, an electronic cigarette in the prior art comprises a battery casing 11', a battery 10 which is accommodated in the battery casing 11', a control module 2' which is used for controlling the battery to charge an atomizing assembly, and an end cover 12' which is inserted at one end of the battery casing 11 and is made of hard plastic material. The control module 2' is defined with wires 3' which are connected to the battery, an airflow sensor which is used for responding to a smoking action and a lamp which is used for simulating burning of a real cigarette (not shown in the figure).

However, the end cover which is hard cannot be matched or sealed well with the control module 2', resulting in a gas leakage phenomenon, thus, when smoking intensity is light, the airflow sensor is not easy to detect a smoking airflow, and the sensitivity of the electronic cigarette is effected, leading to a poor user experience; when assembly, the control module 2' is compacted and arranged in the end cover 12', the control module 12' is easy to be damaged by the end cover 12' which is hard, and the wires 3' which are connected to the control module 12' is easy to be broken or fractured, causing a phenomenon of short circuit or open circuit of a circuit; and during a process that the control module 2' is installed in the end cover 12', in order to reduce the gas leakage phenomenon and avoid a break of the wires 3', a very careful calibration of the control module 2 is usually required, thus the assembly efficiency is low. Besides, the control module 2' is close to an end of the end cover 12', causing a problem that the light is uneven when the lamp light is emitted from the end cover 12' end, which means that light of the middle area is brighter than that of the edge area, and the simulating effect of burning of a real cigarette is poor.

BRIEF SUMMARY

The object of the present application is to provide a battery rod which enables a well sealing and the wires are not easy to be broken or fractured, a method for assembling the battery rod, and an electronic cigarette which is adopted the battery rod, aiming at the drawbacks in the prior art that the end cover cannot be matched or sealed well with the control module which leads to a gas leakage phenomenon, and the wires are easy to be broken or fractured.

In one aspect, an electronic cigarette is provided, which comprises an atomizer assembly and a battery assembly. The battery rod comprises a battery casing, a battery which is accommodated in the battery casing, a control module which is utilized for controlling the battery to supply power to the atomizing assembly, and an end cover which is interposed at one end of the battery casing; the control module is provided with wires which are connected to the battery, and an airflow sensor which is utilized for sensing a smoking action, wherein the end cover comprises a cover body which is defined outside the battery casing and a connecting sleeve which is interposed at the battery casing; an elastic installation base is embedded inside the connecting sleeve; the control module is embedded on the elastic installation base; an outer peripheral surface of the elastic installation base flexibly abuts against an inner wall of the connecting sleeve, and an inner peripheral surface of the elastic installation base flexibly abuts against an outer peripheral surface of the control module; the wires are arranged and flexibly pressed between the outer peripheral surface of the control module and the inner peripheral surface of the elastic installation base; an air passage is formed between the control module and the cover body; the end cover is provided with an air inlet hole for communicating with the air passage.

In one embodiment, the inner peripheral surface of the elastic installation base is defined with a wire threading slot which is connected with an end surface of the elastic installation base, the wires thread through the wire threading slot and then are connected to the battery.

In one embodiment, an end surface of the control module which is facing to the cover body is defined with a lamp for simulating a burning of a real cigarette; one end of the elastic installation base is further provided with a transparent wall, the transparent wall is defined between the cover body and the control module, the transparent wall is provided with a vent for allowing an airflow to pass through.

In one embodiment, a thickness of the transparent wall is from 0.3 mm to 0.7 mm.

In one embodiment, the battery casing is a metal material product, the end cover is a nonmetallic material product.

In one embodiment, one side of the elastic installation base which is close to the battery is further defined with a wire hiding area which is used for accommodating the wires.

In one embodiment, a first limit step and a second limit step are defined successively and spaced reciprocally in a direction from the inner peripheral surface of the elastic installation base toward the battery, the control module is arranged to be stuck between the first limit step and the second limit step.

In one embodiment, the wire hiding area is enclosed in an area which is surrounded by the second limit step and one side of the control module which is close to the battery.

In one embodiment, along an axial direction of the connecting sleeve, an outer surface of the connecting sleeve is provided with an air inlet slot which is used for communicating an inner part of the battery casing and an outer part of the battery rod.

In one embodiment, an end surface of the connecting sleeve protrudes in a direction toward the battery and forms a convex part which is used for preventing the battery from abutting against the elastic installation base.

In one embodiment, Shore hardness of the elastic installation base is 20 HS to 90 HS.

In this embodiment, the elastic installation base can be a silicone product, a polyurethane product, a polyvinyl chloride product or an ethylene vinyl acetate copolymer product.

In other aspect the present invention further provides an electronic cigarette, comprising an atomizing assembly and a battery rod which are connected with each other, the battery rod comprises a battery casing, a battery which is accommodated in the battery casing, a control module which is utilized for controlling the battery to supply power to the atomizing assembly, and an end cover which is interposed at one end of the battery casing; the control module is provided with wires which are connected to the battery, and an airflow sensor which is utilized for sensing a smoking action, wherein, the end cover comprises a cover body which is defined outside the battery casing and a connecting sleeve which is interposed at the battery casing; an elastic installation base is embedded inside the connecting sleeve; the control module is embedded on the elastic installation base; an outer peripheral surface of the elastic installation base flexibly abuts against an inner wall of the connecting sleeve, and an inner peripheral surface of the elastic installation base flexibly abuts against an outer peripheral surface of the control module; the wires are flexibly pressed between the outer peripheral surface of the control module and the inner peripheral surface of the elastic installation base; an air passage is formed between the control module and the cover body; the end cover is provided with an air inlet hole for communicating with the air passage.

In one embodiment, the inner peripheral surface of the elastic installation base is defined with a wire threading slot which is connected with an end surface of the elastic installation base, the wires thread through the wire threading slot and then are connected to the battery.

In one embodiment, along an axial direction of the connecting sleeve, an outer surface of the connecting sleeve is provided with an air inlet slot which is used for communicating an inner part of the battery casing and an outer part of the battery rod. A wire hiding area which is utilized for accommodating the wires is defined on one side of the elastic installation base which is close to the battery.

In one embodiment, one end of the elastic installation base is further provided with a transparent wall, the transparent wall is defined on one side of the control module which is in an opposite side of the battery, the transparent wall is provided with a vent for allowing an airflow to pass through.

In one embodiment, a thickness of the transparent wall is from 0.3 mm to 0.7 mm.

In this embodiment, the elastic installation base is s soft material product, Shore hardness of the elastic installation base is 20 HS to 90 HS.

In this embodiment, the elastic installation base can be a silicone product, a polyurethane product, a polyvinyl chloride product or an ethylene vinyl acetate copolymer product.

In another aspect, the present invention also provides a method for assembling a battery rod, the method for assembling a battery rod comprises following steps:

S1: connect one ends of wires to a control module;

S2: the control module is embedded inside an elastic installation base to enable an outer peripheral surface of the control module to flexibly abut against an inner peripheral surface of the elastic installation base;

S3: the other ends of the wires thread through a wire threading slot which is formed on the inner peripheral surface of the elastic installation base, and are connected to the battery, then the wires are partly and flexibly clamped between the wire threading slot and the control module;

S4: the control module and the elastic installation base are both defined inside a connecting sleeve of an end cover, making an outer peripheral surface of the elastic installation base flexibly abut against an inner wall of the connecting sleeve;

S5: a battery is positioned inside a battery casing, and the connecting sleeve is interference fitted inside the battery casing.

With application of the battery rod, the electronic cigarette and the method for assembling the battery rod, the following advantages can be achieved: by embedding the control module inside an elastic installation base, and defining the elastic installation base and the control module in the connecting sleeve of the end cover, as an elastic behavior of the elastic installation base, it is possible for an outer peripheral surface of the elastic installation base to abut against an inner wall of the connecting sleeve, an inner peripheral surface of the elastic installation base to abut against an outer peripheral surface of the control module, thus a well sealing performance is achieved, the air tightness is ensured, and the sensitivity of the electronic cigarette and the experience of customers are further improved. Meanwhile, as the elastic behavior of the elastic installation base, a broken of the control module which caused by a compaction of the end cover can be avoided when the end cover is inserted in the battery casing, and the wires are not be broken or fractured when the wires are arranged and clamped between the elastic installation base and the control module, thus, the wires are well protected, and the phenomenon of short circuit and open circuit which are caused by a break or fracture of the wires can be avoided. Besides, during assembling process, by positioning the elastic installation base which is embedded by the control module in the connecting sleeve before inserting the connecting sleeve into the battery casing; during the assembling process, the outer peripheral surface of the elastic installation base is naturally abutted against the inner wall of connecting sleeve, the air tightness between the elastic installation base and the connecting sleeve is not necessary to be focused on, thus, the assembly is convenient, and the assembly efficiency is high.

BRIEF DESCRIPTION OF THE DRAWINGS

The present application will be further described with reference to the accompanying drawings and embodiments in the following. Obviously, the following accompanying drawings are only parts of the present application and it is possible for one skilled in the art to obtain other accompanying drawings according to these.

DETAILED DESCRIPTION OF THE PREFERRED EMBODIMENT

Figure 1:
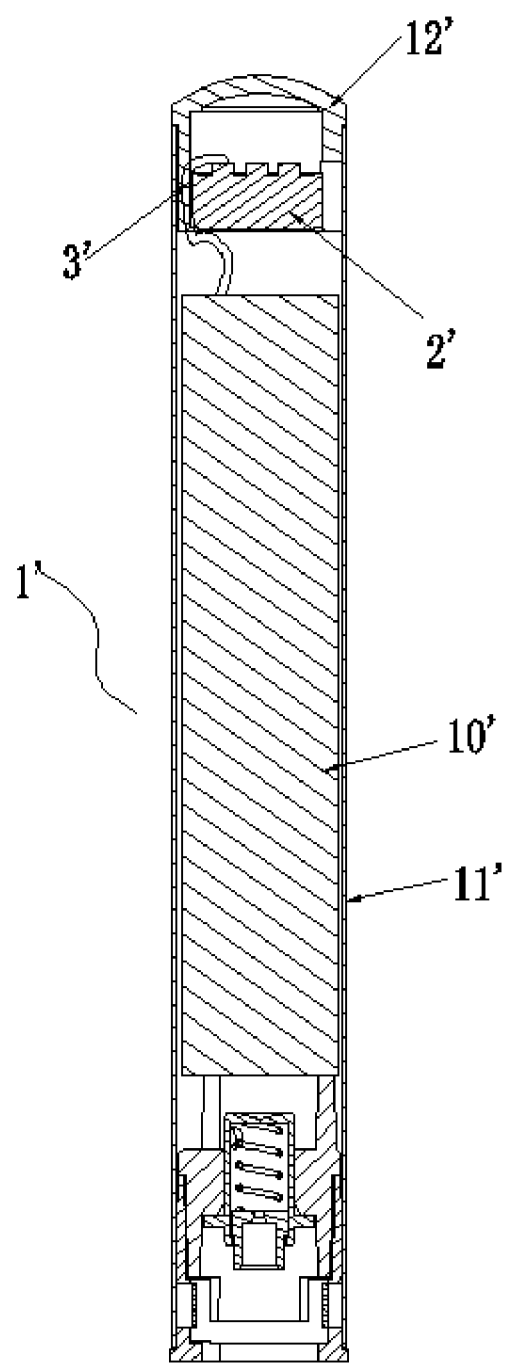
FIG. 1 is a cutaway view of a battery rod provided by the prior art.

In order to solve the drawbacks in the prior art that, it is difficult for a control module 2 to match or seal well with a connecting sleeve 122 when the control module 2 is positioned inside the connecting sleeve 122, thus a sensitivity of an electronic cigarette is effected, meanwhile, wires 3 which are connected to the control module 2 are easy to be broken when the control module 2 is placed into the connecting sleeve 122, a creativity of the present invention is to add an elastic installation base 4 which has an elastic property, enabling the wires 3 are partly and flexibly clamped between the control module 2 and the elastic installation base 4, as an elastic behavior of the elastic installation module 4, when the wires pass, the elastic installation base 4 has an elastic deformation because of a compression of the wires 3 and ensures the wires to be protected effectively, thus a phenomenon of a break or a fracture in the prior arts can be avoided. Meanwhile, compared with the prior arts, a well sealing performance is achieved, an air tightness between the control module 2 and the connecting sleeve 122 is ensured, and the sensitivity of the electronic cigarette and experiences of customers are further improved. Besides, during an assembling process that the elastic installation base 4 which is embedded by the control module 2 is positioned in the connecting sleeve 122, then the connecting sleeve 122 is inserted into the battery casing 11; during the assembling process, an outer peripheral surface of the elastic installation base 4 is naturally abutted against an inner wall of connecting sleeve 122, the air tightness between the elastic installation base and the connecting sleeve is not necessary to be focused on, thus, the assembly is convenient, and the assembly efficiency is high.

The example embodiments of the present application will be further described with referencing to the accompanying drawings, to have a clear understanding of the technical features, purposes and effects of the present invention. Obviously, the following example embodiments are only parts of the embodiments of the present application.

Figure 2:
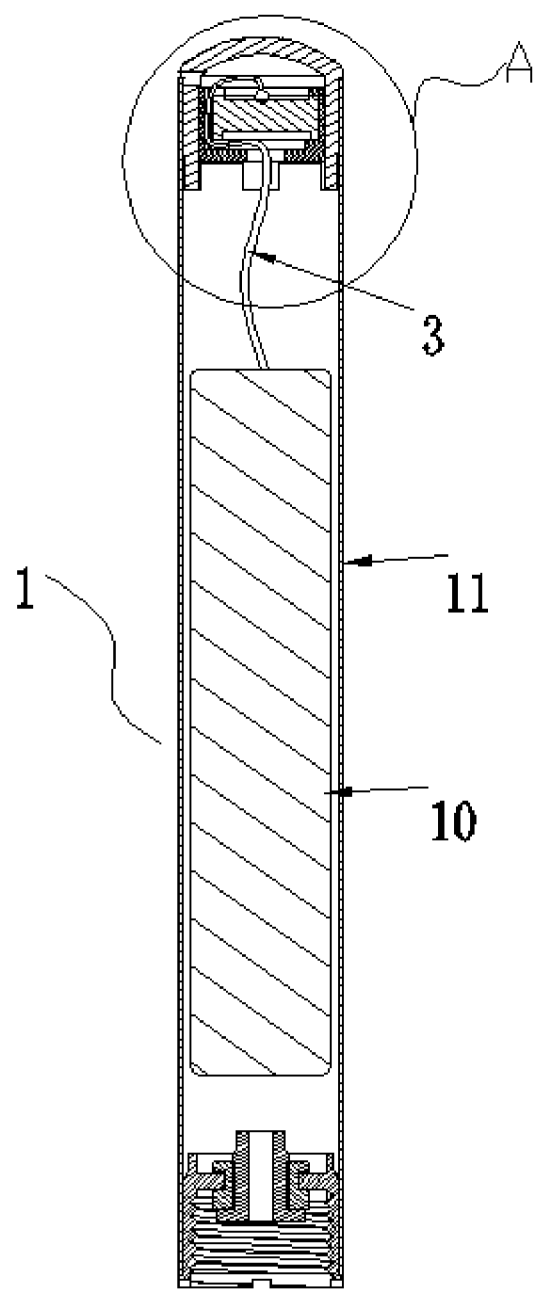
FIG. 2 is a cutaway view of a battery rod provided by a first embodiment of the present application.

Refer to FIG. 2, a battery rod 1 provided by a first embodiment of the present application which is utilized for forming an electronic cigarette in a combination with an atomizing assembly, the battery rod 1 comprises a battery casing 11, a battery 10 which is accommodated in the battery casing 11, a control module 2 which is used for controlling the battery to supply power to the atomizing assembly, and an end cover 12 which is interposed at one end of the battery casing 11, the control module 2 is provided with wires 3 which are connected to the battery 10, and an airflow sensor used for sensing a smoking action, the end cover 12 comprises a cover body 121 which is defined outside the battery casing 11, and a connecting sleeve 122 which is interposed at the battery casing 11, an elastic installation base 4 is embedded inside the connecting sleeve 122; the control module 2 is embedded on the elastic installation base 4; an outer peripheral surface of the elastic installation base 4 flexibly abuts against an inner wall of the connecting sleeve 122, and an inner peripheral surface of the elastic installation base 4 flexibly abuts against an outer peripheral surface of the control module 2, the wires 3 are arranged and partly and flexibly pressed between the outer peripheral surface of the control module 2 and the inner peripheral surface of the elastic installation base 4, an air passage 5 is formed between the control module 2 and the cover body 121, the end cover 12 is provided with an air inlet hole 123 for communicating with the air passage 5. An area range of the air inlet hole 123 is from 1 square millimeter to 2 square millimeters, preferably, an area of the air inlet hole 123 is selected to be 1.5 square millimeters.

During a smoking process, an airflow enters the air passage 5 from the air inlet hole 123, the airflow sensor which is installed on the control module 2 detects the airflow entering into the air passage 5, thus to control the atomizing assembly to atomize cigarette oil. As the air passage 5 is formed between the control module 2 and the cover body 121, a well air tightness between the control module 2 and the cover body 121 is required. In the present invention, by embedding the control module 2 into the elastic installation base 4 which has an elastic property, then embedding the elastic installation base into the connecting sleeve 122, and by applying the elastic installation base 4 with an elastic property to enable the outer peripheral surface of the elastic installation base 4 flexibly abuts against the inner wall of the connecting sleeve 122, and the inner peripheral surface of the elastic installation base 4 flexibly abuts against the outer peripheral surface of the control module 2, thus to improve the air tightness between the control module 2 and the connecting sleeve 122, and to further improve the sensitivity of the airflow sensor. Meanwhile, as an elastic behavior of the elastic installation module 4, when the wires are clamped between the elastic installation base 4 and the control module 2, the wires are not easy to be broken or fractured.

Besides, during an assembly of the electronic cigarette, the wires 3 are must arranged and clamped between the connecting sleeve 122 and the control module 2. In the present invention, by providing the elastic installation base 4 and holding the wires 3 between the elastic installation base 4 and the control module 2, even with a presence of the wires 3, there is no gap between the elastic installation base 4 and the control module 2.

In order to ensure a more reliable structure of a battery assembly and to prevent the end cover 12 from falling off, the battery casing 11 is a metal material product, the end cover 12 is a nonmetallic material product. In the present embodiment, the battery casing 11 is a steel tube, the end cover 12 is a plastic product. The elastic installation base 4 is a soft material product, and Shore hardness of the elastic installation base 4 is 20 HS to 90 HS. Preferably, Shore hardness is selected as 45 HS. The elastic installation base 4 is a silicone product, a polyurethane product, or a polyvinyl chloride product or an ethylene vinyl acetate copolymer product, it is not limited here.

To further improve the air tightness, a sealing component can be defined between the control module 2 and the elastic installation base 4, such as a sealing circle or a resin which is utilized to seal the two.

Figure 3:
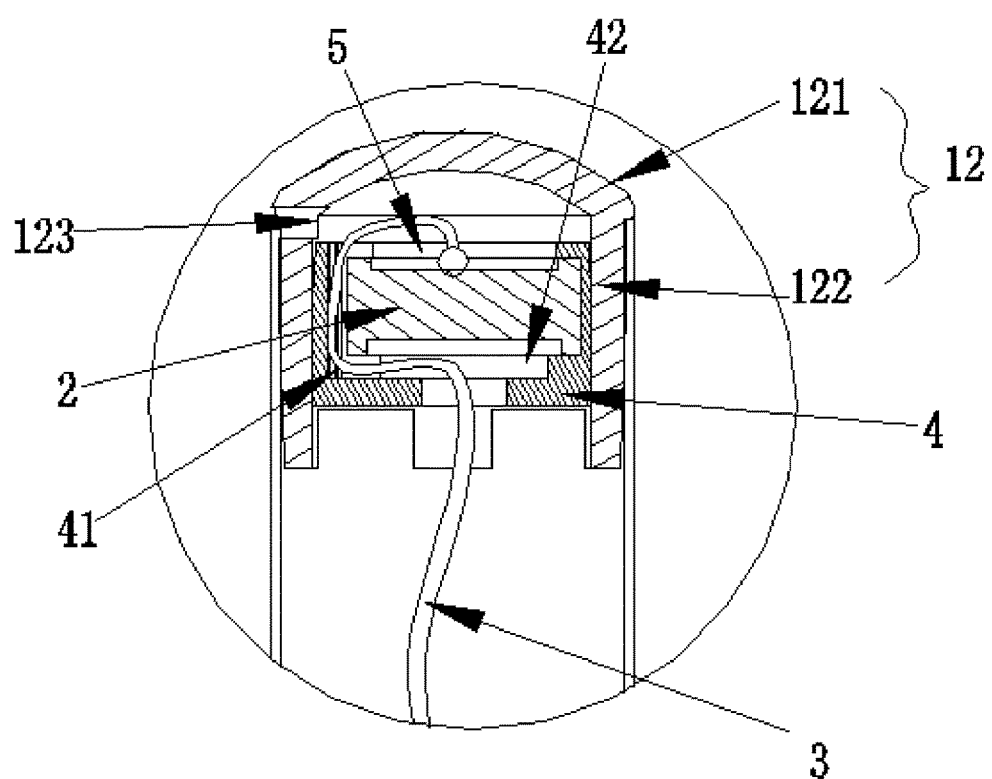
FIG. 3 is an amplify view of section A in FIG. 2.
Figure 5:
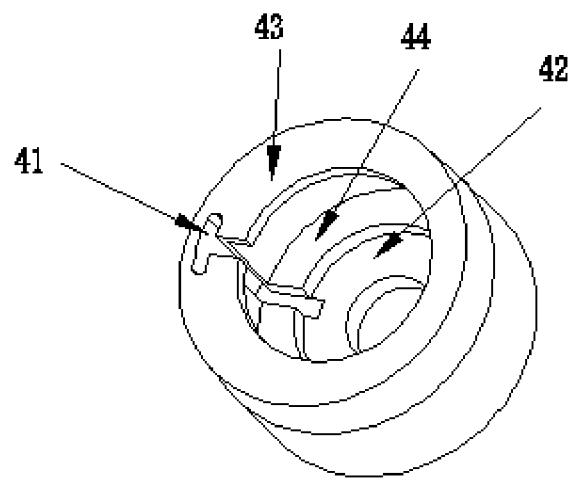
FIG. 5 is a structure diagram of an elastic installation base in FIG. 2.

As shown in FIG. 3 and FIG. 5, preferably, the inner peripheral surface of the elastic installation base 4 is defined with a wire threading slot 41 which is connected with an end surface of the elastic installation base 4, the wires 3 thread through the wire threading slot and then are connected to the battery 10. As a presence of the wire threading slot 41, the wires 3 are conveniently arranged and held between the elastic installation base 4 and the control module 2, and prevent the wires from breaking caused by an excessive compression.

Figure 6:
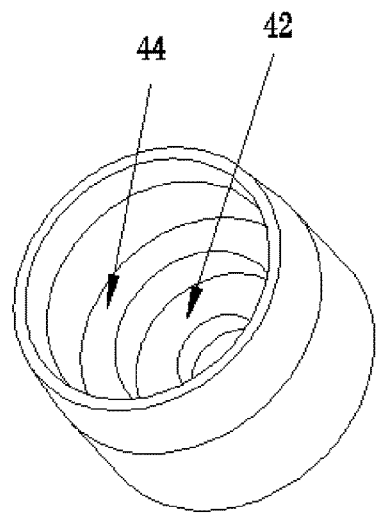
FIG. 6 is a structure diagram of an elastic installation base provided by the other embodiment of the present application.

Refer to FIG. 6, in the other embodiment of the present invention, the inner peripheral surface of the elastic installation base 4 is defined without the wire threading slot 41, the wires 3 can be directly held between the inner peripheral surface of the elastic installation base 4 and the outer surface of the control module 2.

Figure 4:
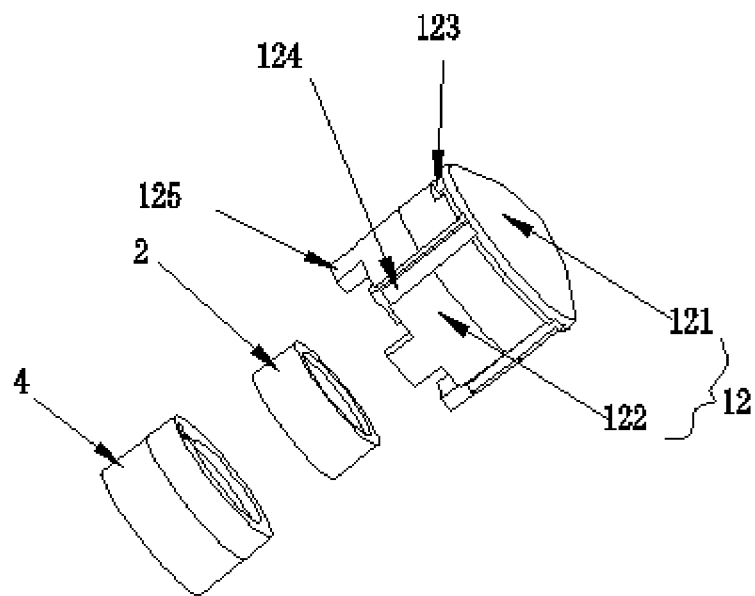
FIG. 4 is a decomposed structure diagram of an end cover, an elastic installation base and a control module in FIG. 2.

Further, as shown in FIG. 4, an outer peripheral surface of the connecting sleeve 122 along an axial direction of the connecting sleeve 122 is provided with an air inlet slot 124 which is utilized for communicating an inner part of the battery casing 10 and an outer part of the battery rod 1. By providing the air inlet slot 124, when air is inhaled during smoking, not only increases quantity of air inlet passage, prevents users from feeling suffocated, but also ensure that the structure intensity of end cover 12.

Besides, as shown in FIG. 3 and FIG. 5, an end surface of the connecting sleeve 122 protrudes in a direction toward the battery 10 and forms a convex part 125 which is used for preventing the battery 10 from abutting against the elastic installation base 4. One side of the elastic installation base 4 which is close to the battery 10 is further defined with a wire hiding area 42 which is used for accommodating the wires 3.

In the prior arts, in order to facilitate an installation, the length of the wires 3 is generally greater than that of the battery rod 1, after installing the battery rod 1, the wires 3 are kneaded into a mass, and the wires 3 are easy to be broken without a fixed space for accommodating the wires. Meanwhile, that an outer surface of the wires 3 contacts with the battery casing 11 which is made of hard materials may easily results in a phenomenon of wearing and tearing the wires 3. In the present embodiment, the wire hiding area 42 which is defined on the elastic installation base 4, not only provides a fixed accommodating space, but also protects the wires 3 well, as the outer surface of the wires are contacted with the elastic installation base 4 which has an elastic property.

Specifically, a first limit step 43 and a second limit step 44 are defined successively and spaced reciprocally in a direction from the inner surface of the elastic installation base 4 toward the battery 10, the control module 2 is arranged to be stuck between the first limit step 43 and the second limit step 44. The wire hiding area 42 is enclosed in an area which is surrounded by the second limit step 44 and one side of the control module 2 which is close to the battery 10.

Understandably, a wire blocking portion that enables the wires to go through can be defined on one side of the wire hiding area 42 which is opposite to the control module 2, the wire blocking portion, the side of the control module 2 which is close to the battery 10 and the second limit step 44 enclose the wire hiding area 42.

In the battery rod of the present invention, the control module comprises a microprocessor and the airflow sensor which is connected to the microprocessor, and other components in the battery rod are all the prior arts, and are not repeated here.

Figure 7:
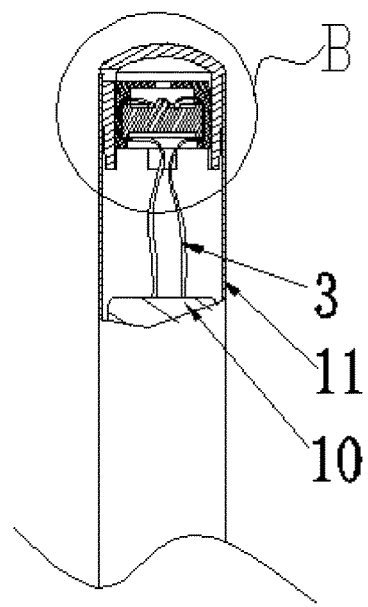
FIG. 7 is a cutaway diagram of a battery rod provided by a second embodiment of the present application.
Figure 8:
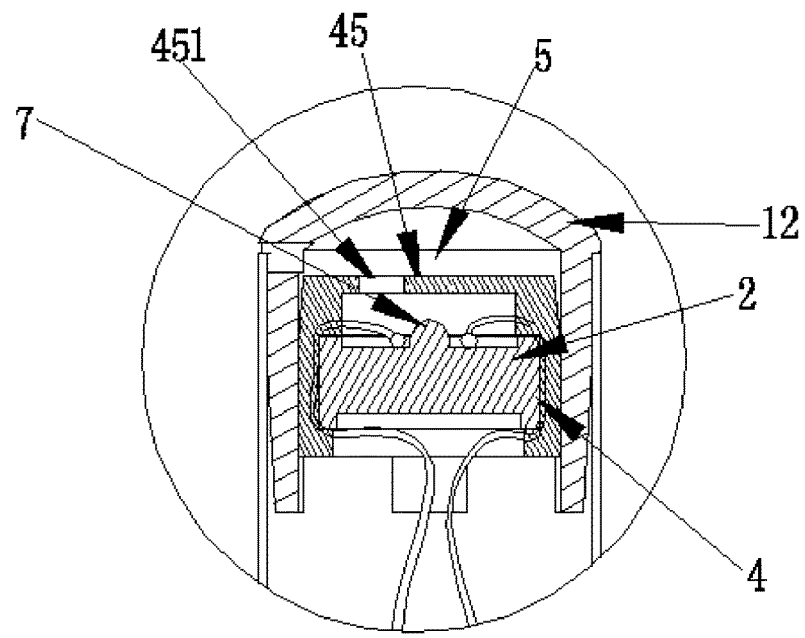
FIG. 8 is an amplify view of section B in FIG. 7.
Figure 9:
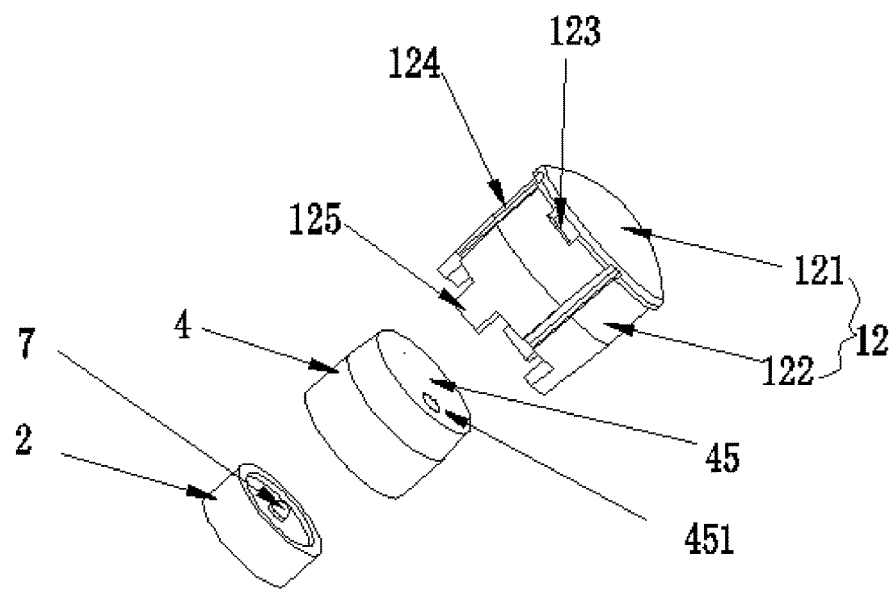
FIG. 9 is a decomposed structure diagram of an end cover, an elastic installation base and a control module in FIG. 7.

Refer to FIG. 7, FIG. 8 and FIG. 9, a battery rod in a second embodiment, the battery rod 1 is a battery rod 1 with an emitting end. An end surface of the control module 2 is defined with a lamp 7 for simulating burning of a real cigarette, the lamp 7 is preferably selected as an energy saving LED lamp, the end cover 12 is a transparent or translucent part. One end of the elastic installation base 4 is further provided with a transparent wall 45, the transparent wall 45 is defined between the cover body 121 and the control module 2, the transparent wall 45 is provided with a vent 451 for allowing an airflow to pass through. A thickness of the transparent wall 45 is 0.3 mm to 0.7 mm. The air inlet hole 123, the vent 451 and one side of the control module 2 which is close to the transparent wall 45 are communicated to for the air passage 5. In order to ensure an air input of the air inlet hole 123 is equaled to that of the vent 451, the area of the vent 451 is roughly equaled to that of the air inlet hole 123, a rang of the area is 1 square millimeter to 2 square millimeters.

the transparent wall 45 is not limited to the types of the above, the transparent wall 45 can be a concave lens.

Light emitted from the lamp 7 can be scattered by defining the transparent wall 45, to avoid a phenomenon of an uneven distribution of the light which is caused by an over centralized light.

Understandably, other structures of the battery rod 1 of the second embodiment are similar to those of the battery rod 1 in the first embodiment, do not repeat here.

The present invention further provides an electronic cigarette, comprising an atomizing assembly (not labeled in figures) and a battery rod 1 which are connected with each other, the electronic cigarette which is formed by the atomizing assembly and the battery rod 1 can be a detachable electronic cigarette or a undetachably integral electronic cigarette. Wherein, the battery rod 1 of the electronic cigarette can be the battery rod 1 of anyone of the above embodiments, as the battery rod 1 has the same structures of the battery rod 1 of anyone of the above embodiments, the electronic cigarette has corresponding technical effects. Besides, as the atomizing assembly is the prior arts, does not repeat here.

the present invention further provides a method for assembling a battery rod, the battery rod 1 which is assembled is the battery rod 1 which is described in the first or the second embodiment, the method for assembling a battery rod comprises following steps:

S1: connect wires 3 to a control module 2;

S2: the control module 2 is embedded inside an elastic installation base 4 to enable an outer peripheral surface of the control module 2 to flexibly abut against an inner peripheral surface of the elastic installation base 4;

Wherein, in an elastic behavior of the elastic installation base 4, an outer peripheral surface of the elastic installation base 4 flexibly abuts against an inner wall of the connecting sleeve 122, and an inner peripheral surface of the elastic installation base 4 flexibly abuts against an outer peripheral surface of the control module 2, thus to further improve a sensitivity of the airflow sensor.

S3: the wires 3 thread through a wire threading slot 41 which is formed on the inner peripheral surface of the elastic installation base 4, and are connected to the battery 10, then the wires 3 are partly and flexibly clamped between the wire threading slot 41 and the control module 2;

Wherein, an elastic behavior of the elastic installation base 4, the wires 3 are not easy to be broken or fractured when the wires 3 are partly and flexibly clamped between the wire threading slot 41 and the control module 2;

S4: the control module 2 and the elastic installation base 4 are both defined inside a connecting sleeve 122, making an outer peripheral surface of the elastic installation base 4 flexibly abut against an inner wall of the connecting sleeve 122;

S5: a battery 10 is positioned inside a battery casing 11, and the connecting sleeve 122 is interference fitted inside the battery casing 11.

A first limit step 43 and a second limit step 44 are defined successively and spaced reciprocally in a direction from the inner surface of the elastic installation base 4 toward the battery 10, the control module 2 is arranged to be stuck between the first limit step 43 and the second limit step 44. The wire hiding area 42 is enclosed in an area which is surrounded by the second limit step 44 and one side of the control module 2 which is close to the battery 10. As the control module 2 is arranged to be stuck between the first limit step 43 and the second limit step 44, the control module 2 cannot be removed, thus the wires 3 are relatively stably positioned in the area between the elastic installation base 4 and the control module 2, a relative movement of the wires 3 cannot be generated to cause damages of the wires 3 because of a shaking of the control module 2.

A step S41 is further comprised between the step S4 and the step S5: parts of the wires are hided in the wire hiding area 42 to achieve a length that enable the battery 10, the control module 2 and the elastic installation base 4 are well positioned into the battery casing 11.

In general, with application of the battery rod, the electronic cigarette and the method for assembling the battery rod, the following advantages can be achieved: by positioning the control module 2 into the elastic installation base 4 which has an elastic property, before inserting the elastic installation base 4 into the end cover 12 of the battery casing 122, the outer peripheral surface of the elastic installation base 4 is naturally abutted against the inner wall of the connecting sleeve 122, a well air tightness between the control module 2 and the connecting sleeve 122 is achieved, and the sensitivity of the airflow sensor is improved. Meanwhile, when the wires 3 are arranged and flexibly pressed between the control module 2 and the elastic installation base 4, as an elastic behavior of the elastic installation module 4, the wires are not easy to be broken or fractured. Besides, when the end of the battery rod 1 can emit, the transparent wall 45 is defined between the cover body 121 and the control module 2, thus, light can be scattered by defining the transparent wall 45, to avoid a phenomenon of an uneven distribution of the light which is caused by an over centralized light. Moreover, during an assembling process, by positioning the elastic installation base which is embedded by the control module in the connecting sleeve then inserting the connecting sleeve into the battery casing, the outer peripheral surface of the elastic installation base is naturally abutted against the inner wall of the connecting sleeve, the air tightness between the elastic installation base and the connecting sleeve is not necessary to be focused on, thus, the assembly is convenient, and the assembly efficiency is high.

Above illustrated embodiments of the present invention with attached figures, which are only some preferable embodiments of the present invention, cannot be utilized to limit the claim scope of the present invention. The specific implementation of the above is only schematic, rather than restrictive. It should be understood that, in the inspiration of the present application, those skilled in the art who appreciate and realize all or part of the process in above embodiments may make many modifications or alternatives, without going beyond the purpose and the scope the claims intend to protect of the present application. All these belong to the protection of the present application.

What is claimed is:

1. A battery rod configured to be connected with an atomizing assembly to form an electronic cigarette, comprising:
    a battery casing (11);
    a battery (10) mounted inside the battery casing (11);
    a control module (2) configured to control the battery (10) to supply power to the atomizing assembly, and
    an end cover (12) mounted on one end of the battery casing (11);
    wherein the control module (2) is provided with wires (3) which are electrically connected to the battery (10), and an airflow sensor which is utilized for sensing a smoking action;
    wherein the end cover (12) comprises a cover body (121) which is defined outside the battery casing (11) and a connecting sleeve (122) which is interposed at the battery casing (11);
    wherein an elastic installation base (4) is embedded inside the connecting sleeve (122); the control module (2) is embedded on the elastic installation base (4); an outer peripheral surface of the elastic installation base (4) flexibly abuts against an inner wall of the connecting sleeve (122), and an inner peripheral surface of the elastic installation base (4) flexibly abuts against an outer peripheral surface of the control module (2);
    wherein the wires (3) are arranged and flexibly pressed between the outer peripheral surface of the control module (2) and the inner peripheral surface of the elastic installation base (4); and
    wherein an air passage (5) is formed between the control module (2) and the cover body (121); and the end cover (12) is provided with an air inlet hole (123) which is communicated with the air passage (5).

2. The battery rod according to claim 1, wherein the inner peripheral surface of the elastic installation base (4) is defined with a wire threading slot (41) which is connected with an end surface of the elastic installation base (4), the wires (3) thread through the wire threading slot (41) and then are connected to the battery (10).

3. The battery rod according to claim 1, wherein an end surface of the control module (2) which is facing to the cover body (121) is defined with a lamp (7) for simulating a burning of a real cigarette; one end of the elastic installation base (4) is further provided with a transparent wall (45), the transparent wall (45) is defined between the cover body (121) and the control module (2), the transparent wall (45) is provided with a vent (451) for allowing an airflow to pass through.

4. The battery rod according to claim 3, wherein a thickness of the transparent wall (45) is from 0.3 mm to 0.7 mm.

5. The battery rod according to claim 1, wherein the battery casing (11) is a metal material product, the end cover (12) is a nonmetallic material product.

6. The battery rod according to claim 1, wherein one side of the elastic installation base (4) which is close to the battery (10) is further defined with a wire hiding area (42) which is used for accommodating the wires (3).

7. The battery rod according to claim 6, wherein a first limit step (43) and a second limit step (44) are defined successively and spaced reciprocally in a direction from the inner peripheral surface of the elastic installation base (4) toward the battery (10), the control module (2) is arranged to be stuck between the first limit step (43) and the second limit step (44).

8. The battery rod according to claim 7, wherein the wire hiding area (42) is enclosed in an area which is surrounded by the second limit step (44) and one side of the control module (2) which is close to the battery (10).

9. The battery rod according to claim 2, wherein along an axial direction of the connecting sleeve (122), an outer surface of the connecting sleeve (122) is provided with an air inlet slot (124) which is used for communicating an inner part of the battery casing (10) and an outer part of the battery rod (1).

10. The battery rod according to claim 2, wherein an end surface of the connecting sleeve (122) protrudes in a direction toward the battery (10) and forms a convex part (125) which is used for preventing the battery (10) from abutting against the elastic installation base (4).

11. The battery rod according to claim 1, wherein Shore hardness of the elastic installation base (4) is 20 HS to 90 HS.

12. The battery rod according to claim 1, wherein the elastic installation base (4) can be a silicone product, a polyurethane product, a polyvinyl chloride product or an ethylene vinyl acetate copolymer product.

13. An electronic cigarette comprising an atomizing assembly and a battery rod, wherein the battery rod (1) comprises a battery casing (11), a battery (10) mounted inside the battery casing (11), a control module (2) configured to control the battery (10) to supply power to the atomizing assembly, and an end cover (12) mounted on one end of the battery casing (11);

wherein the control module (2) is provided with wires (3) which are electrically connected to the battery (10), and an airflow sensor which is utilized for sensing a smoking action;

wherein the end cover (12) comprises a cover body (121) which is defined outside the battery casing (11) and a connecting sleeve (122) which is interposed at the battery casing (11);

wherein an elastic installation base (4) is embedded inside the connecting sleeve (122); the control module (2) is embedded on the elastic installation base (4); an outer peripheral surface of the elastic installation base (4) flexibly abuts against an inner wall of the connecting sleeve (122), and an inner peripheral surface of the elastic installation base (4) flexibly abuts against an outer peripheral surface of the control module (2);

wherein the wires (3) are flexibly pressed between the outer peripheral surface of the control module (2) and the inner peripheral surface of the elastic installation base (4); and wherein an air passage (5) is formed between the control module (2) and the cover body (121); the end cover (12) is provided with an air inlet hole (123) which is communicated with the air passage (5).

14. The electronic cigarette according to claim 13, wherein the inner peripheral surface of the elastic installation base (4) is defined with a wire threading slot (41) which is connected with an end surface of the elastic installation base (4), the wires (3) thread through the wire threading slot and then are connected to the battery (10).

15. The electronic cigarette according to claim 14, wherein along an axial direction of the connecting sleeve (122), an outer surface of the connecting sleeve (122) is provided with an air inlet slot (124) which is used for communicating an inner part of the battery casing (10) and an outer part of the battery rod (1).

16. The electronic cigarette according to claim 14, wherein one end of the elastic installation base (4) is further provided with a transparent wall (45), the transparent wall (45) is defined on one side of the control module (2) which is in an opposite side of the battery (10), the transparent wall (45) is provided with a vent (451) for allowing an airflow to pass through.

17. The electronic cigarette according to claim 16, wherein a thickness of the transparent wall (45) is from 0.3 mm to 0.7 mm.

18. The electronic cigarette according to claim 13, wherein the elastic installation base (1) is s soft material product, Shore hardness of the elastic installation base (4) is 20 HS to 90 HS.

19. The electronic cigarette according to claim 13, wherein the elastic installation base (4) can be a silicone product, a polyurethane product, a polyvinyl chloride product or an ethylene vinyl acetate copolymer product.

* * * * *